United States Patent
Brinkmann

[11] Patent Number: 5,906,153
[45] Date of Patent: May 25, 1999

[54] CITRUS FRUIT PRESS

[76] Inventor: Georg Brinkmann, Pöhlenweg 3, DE-49176 Hilter, Germany

[21] Appl. No.: 09/092,800

[22] Filed: Jun. 5, 1998

[30] Foreign Application Priority Data

Jun. 6, 1997 [DE] Germany ............ 297 09 881 U

[51] Int. Cl.⁶ ............................................. A23N 1/00
[52] U.S. Cl. ......................... 99/502; 99/504; 99/507
[58] Field of Search ................. 99/495, 501–508, 99/481, 489; 100/98 R, 108, 213; 426/481, 489, 518, 599

[56] References Cited

U.S. PATENT DOCUMENTS

| | | | |
|---|---|---|---|
| 2,065,271 | 12/1936 | Faulds | 99/504 X |
| 2,114,218 | 4/1938 | Edenfield | 146/3 |
| 2,226,513 | 12/1940 | McKinnis | 99/155 |
| 2,630,849 | 3/1953 | Williams | 99/504 |
| 2,677,402 | 5/1954 | Watkins | 99/504 X |
| 3,103,239 | 9/1963 | Alexander | 99/504 X |
| 3,267,838 | 8/1966 | Bertuzzi | 100/97 |
| 4,421,021 | 12/1983 | Holbrook | 99/495 X |
| 4,479,424 | 10/1984 | Carroll | 100/98 R |
| 4,759,938 | 7/1988 | Rohm | 426/481 |
| 4,974,505 | 12/1990 | Torrisi | 99/502 |
| 5,170,699 | 12/1992 | Senalada | 99/507 X |
| 5,188,021 | 2/1993 | Bushman et al. | 99/502 |
| 5,313,879 | 5/1994 | Otto | 99/507 X |
| 5,445,067 | 8/1995 | Font | 99/502 |

FOREIGN PATENT DOCUMENTS

| | | |
|---|---|---|
| 343488 | 11/1989 | European Pat. Off. . |
| 833897 | 7/1949 | Germany . |
| 871216 | 3/1953 | Germany . |
| 261312 | 3/1947 | Switzerland . |

*Primary Examiner*—Timothy F. Simone
*Attorney, Agent, or Firm*—Flehr Hohbach Test Albritton & Herbert; Steven F. Caserza

[57] ABSTRACT

A citrus fruit press with at least one pressing unit with a feed device having two hollow receptacle carriers, which can be moved symmetrically with respect to one another from a mutually facing receiving position, via a cutting position, into a pressing position and each has at least one fruit-half-receiving hollow receptacle, and with two pressing tools, which rotate about in each case one of two parallel spindles and are mounted on a carriage which can advance and return the pressing tools, in the pressing position, into and from the hollow receptacles by a thrusting device, wherein the thrusting device acts on the carriage via a compressive device on the advancement side.

14 Claims, 2 Drawing Sheets

CITRUS FRUIT PRESS

BACKGROUND OF THE INVENTION

The invention relates to a citrus fruit press.

Citrus fruit presses are used extensively, in particular in the catering sector, for example, in hotel restaurants, where guests often like to be served freshly squeezed orange juice. In other cases too, it is of interest to have fresh lemon juice or grapefruit juice rather than the bottled variety.

PRIOR ART

EP 0 343 488 A2 describes a citrus fruit press in which two rotating pressing tools, which thus also remove the flesh of the fruit, engage in the fruit halves, it being possible for these pressing tools to be displaced axially in the forward and rearward directions by means of a carriage. The pressing tools each have a pressing-tool head which is seated on a pressing-tool shank in a spring-prestressed manner. The spring prestressing forces the pressing-tool head upward with respect to the pressing-tool shank and, during the pressing operation, allows the pressing-tool shank to be lowered slightly in order to achieve a careful pressing action and to avoid impingement on the skin of the citrus fruit, since otherwise bitter substances and constituents that are not suitable for consumption would pass out of the skin into the pressed juice and would spoil the juice.

However, it has proven disadvantageous that such citrus fruit presses are susceptible to wear and, due to the skins of citrus fruits being of non-uniform thicknesses, tend to impinge on the skin of the citrus fruit.

The object of the invention is thus to provide a citrus fruit press which is of straightforward design and reduces the risk of rotating pressing tools impinging on the skin.

OBJECTS AND SUMMARY OF THE INVENTION

In accordance with the teachings of this invention, the advancement of the pressing tools is spring-cushioned, to be precise in a manner which is separate from the rotating pressing tools themselves. This achieves a careful, low-pressure pressing action, with the result that the risk of impinging on the skin of the fruit is reduced to a considerable extent.

In interposition of a compression-spring arrangement between the thrusting device and carriage means that, when the pressing tools come into contact with the flesh of a fruit half, and thus a resistance counteracts the thrusting device, the latter results in a compression of a compression-spring arrangement. The relief pressure from the compression-spring arrangement can be used in order to allow the pressing tools to work their way carefully into the fruit halves.

For this operation of the pressing tools working their way into the fruit halves for the purpose of pressing the fruit, the citrus fruit press may be configured such that the advancement of the thrusting device is restricted by a selectable advancement-side stop. This advancement-side stop can be adjusted such that the pressing tools can only penetrate into the fruit halves to a selectable depth. The compression-spring arrangement then makes it possible for the thrusting device to result, from the beginning of the pressing operation onwards, in the compression-spring arrangement being compressed and for the pressing tools to work their way into the fruit halves while this built-up spring prestressing decreases, and thus, finally, for the pressing tools to reach the predetermined depth. The pressure acting on the fruit halves for the purpose of pressing the matter thus decreases more and more as the pressing tools approach the skin of the fruit. Furthermore, advancement of the pressing tools into the fruit halves slows down at the beginning of the pressing operation when the advancement device builds up the compression of the compression springs.

It is deemed to be particularly advantageous that designing a compressionspring arrangement separately from the rotating pressing tools themselves renders the rotational movement of the pressing tools more uniform.

The cushioning of the advancement can ensure that the pressing force is restricted, with the result that pressing tools impinge just on the softer interior of a citrus fruit, rather than on the skin thereof In this respect, a good yield of juice and flesh as well as good juice quality are achieved without there being any risk of regularly, or even just sporadically, obtaining pressed juice which, as a result of bitter substances, gives cause for complaint or even, with a content of substances which are not suitable for consumption, may be harmful to health.

In one embodiment, it is further provided that the advancement device can be actuated via a time-control device. This time-control device may be adjusted in dependence on the strength of the flesh of the fruit such that the thrusting device is retained on an advancement-side stop until the compression-spring arrangement of the advancement mechanism has been relieved of pressure to a selectable degree of residual prestressing by the rotating pressing tools penetrating into the fruit halves. The desired pressure profile of a pressing operation with a more pronounced pressing pressure at the beginning of the pressing operation and increasing pressing pressure up to the end of the pressing operation can thus be adjusted in dependence on the quality of the flesh of the fruit.

The time-control device serves, in particular, for ending the pressing operation at the correct time once the pressing tools have reached their end position in the axial advancement direction, this being the case when the compression-spring arrangement has been selectably relieved of pressure, i.e. fully relieved of pressure or relieved of pressure to a selectable degree of residual prestressing.

In one embodiment, the carriage is arranged displaceably on two parallel guide rods, on which thrust blocks of the thrusting device are also arranged. In order to activate these thrust blocks, use can be made of a connecting rod, which, at its other end, is fastened on a rotating actuating disk for moving the thrust blocks in a forward and rearward direction.

An exemplary embodiment of the invention is described in more detail hereinbelow and illustrated in the drawing.

DETAILED DESCRIPTION OF THE INVENTION

Figure 1:
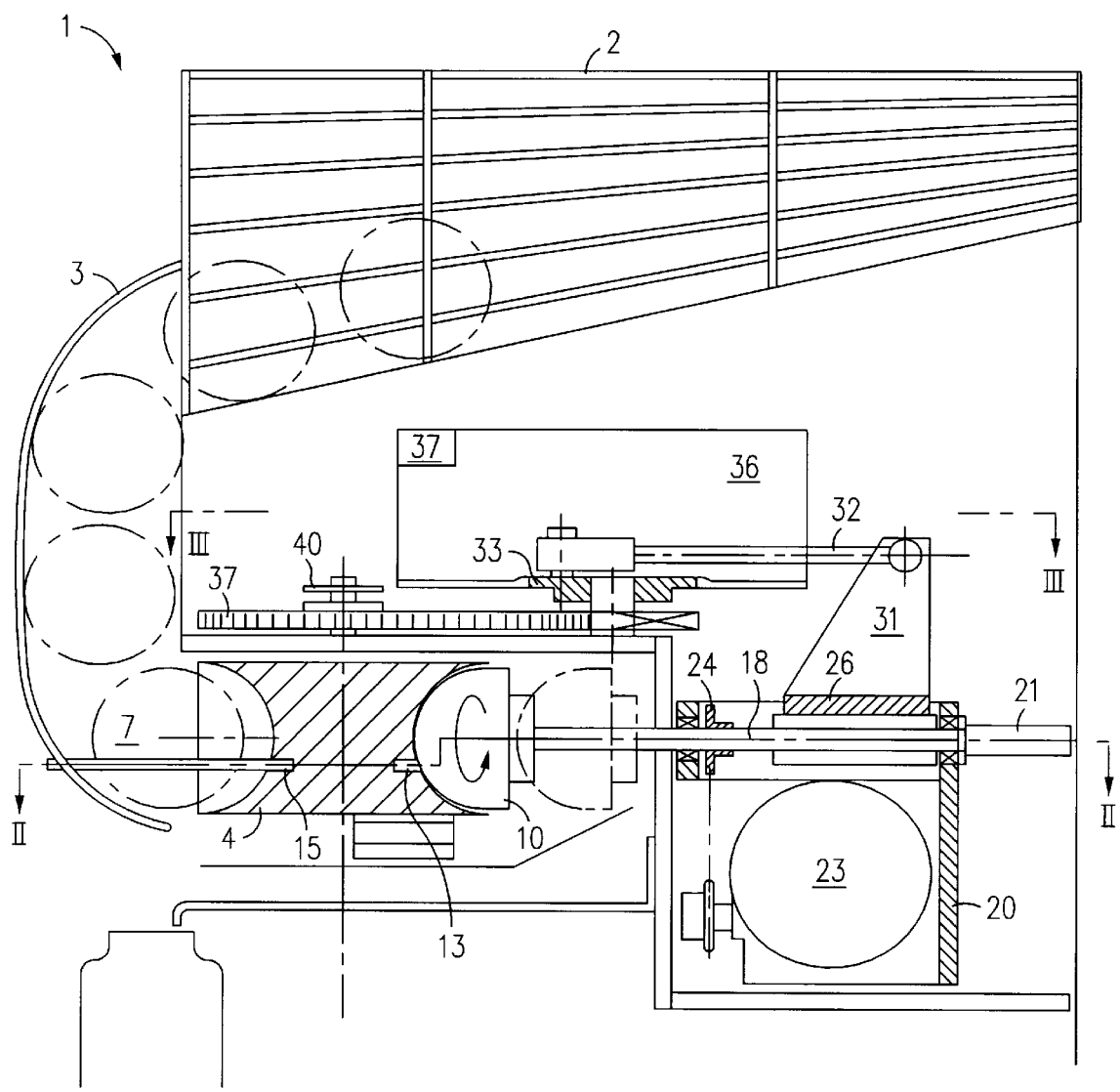
FIG. 1 shows a vertical section through a citrus fruit press along line I—I in FIG. 3.
Figure 2:
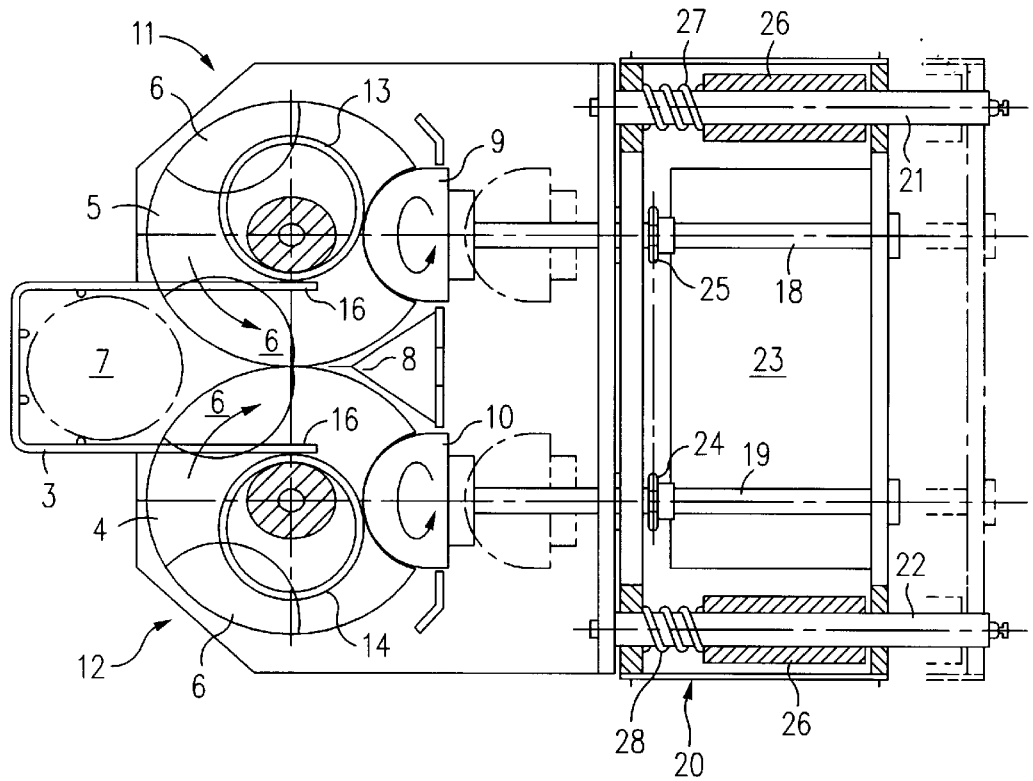
FIG. 2 shows a section along line II—II in FIG. 1.
Figure 3:
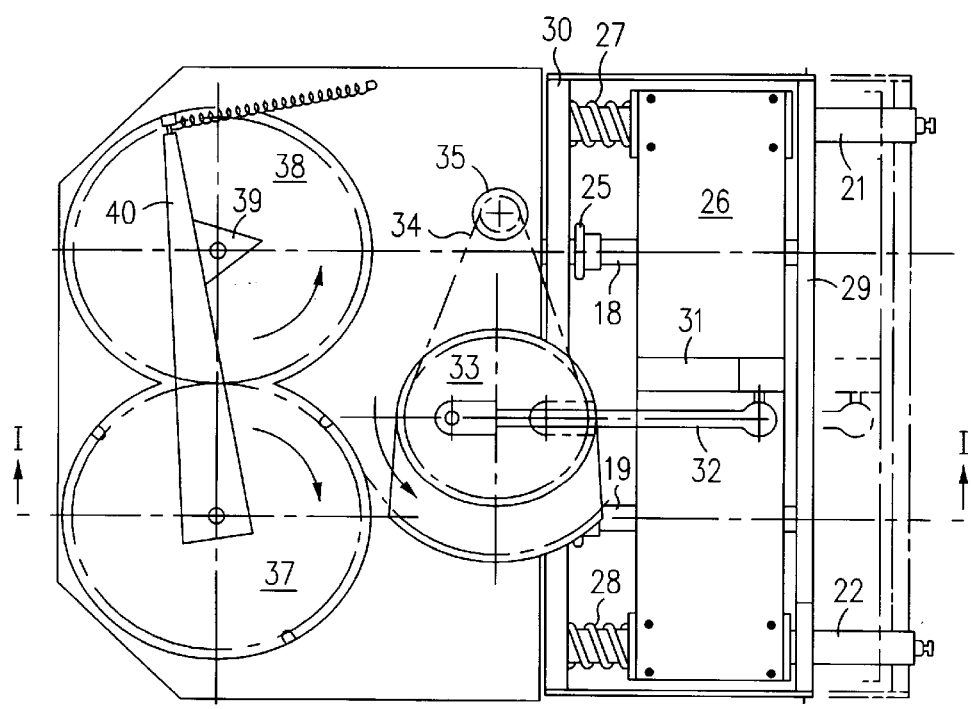
FIG. 3 shows a section along line III—III in FIG. 1.

The citrus fruit press, which is designated as a whole by reference numeral 1 in the drawing, that is only illustrated by way of more detailed parts in FIGS. 2 and 3, and is intended for oranges and grapefruit, in particular, has a basket at the top for fresh, whole fruits which, if necessary separated and displaced via a wobble plate or similar displacement mechanism, pass one after the other into a vertical shaft 3 and, at the bottom end of the latter, into the range of action of the citrus fruit press 1 with at least one pressing unit having a feed device and having a pressing unit. The feed device comprises two round plates 4, 5 which are designed as hollow receptacle carriers and, on their circumferences, have one or more hollow receptacles 6 which receive, for example, half a piece of fruit. Each of the round plates 4, 5 preferably has three hollow receptacles 6, which are spaced apart uniformly on the circumference and also, as a result of synchronized positioning and movement of the round plates 4, 5, are located mirror-invertedly with respect to one another. The movement of the round plates 4, 5 takes place with mirror-symmetry, with the result that a citrus fruit 7, which is indicated by chain-dotted lines in FIG. 2, passes in between two adjacent hollow receptacles 6 of the round plates 4, 5 (receiving position) and then, as stepwise movement continues, passes a fixed cutter 8 (cutting position) in order then, halved into two fruit halves, for the hollow receptacles, once the two round plates 4, 5 have rotated through 120°, to assume a position in which they are aligned parallel to one another (pressing position), where, parallel to one another, two pressing tools 9, 10 pass into the hollow receptacles and press the fruit halves contained therein.

A further rotation of the round plates 4, 5 through 120° leads to an ejecting position 12, in which the fruit halves which have been pressed drop out and are gathered as waste. In order that the fruit halves which have been pressed do not stick or jam, they are moved out of the hollow receptacles 6 by ejector rings 13, 14 which are guided in slits 15 within the round plates and have a considerable amount of play in the radial direction, the fruit being pushed out by elastic pressure-exerting elements 16, in this case formed by bar-type ends of the vertical shaft 3, which press against the respective ejector ring 13 or 14 on that side opposite the ejecting position.

According to the drawing, the pressing tools 9, 10, so-called "removal stars", are of approximately hemispherical design at the front and, furthermore, may be provided with more or less axially running grooves and/or ribs (not illustrated), with the result that, upon rotation about respective drive spindles 18, 19, the rotary engagement produces not just a squeezing action, but also a rubbing or scraping action, by means of which the flesh of the fruit is removed from the fruit halves. The grooves and/or ribs of the pressing tools 9, 10 may also have cutting edges for this purpose.

The pressing tools 9, 10 are driven in rotation about in each case one of two parallel spindles and, as a whole, are moved out of a chain-dotted position into the hollow receptacle and back again. In this case, they are mounted on a box-like carriage, which is designated as a whole by reference numeral 20, is mounted displaceably on two fixed guide rods 21, 22, which run parallel to the drive spindles 18, 19, and bears a geared motor 23 and a chain drive for the shafts 18, 19 with chain wheels 24, 25.

This carriage 20, together with (tool) drive 23, drive spindles 18, 19 and pressing tools 9, 10, is displaced forward and back on the guide rods 21, 22 for the purpose of pressing two appropriately positioned fruit halves. In one embodiment this is done via thrust blocks which are likewise mounted on the guide rods 21, 22 and, in this case, form a crossmember 26 (FIG. 3) which, on the rear side, presses directly against an end wall 29 of the carriage 20 and, on the front side, presses on an end wall 30 of the carriage 20 via two compression springs 27, 28, which are each mounted on the guide rods 21, 22. Accordingly, a thrusting device, which is formed by the crossmember 26, acts on the carriage 20 by way of compression springs on the advancement side.

However, this advancement movement is spring-cushioned rather than forced. The compression springs 27, 28 are compressed when the pressing tools 9, 10 come into contact with a resistance, such as the flesh of a fruit half As this is relieved of pressure, the spring prestressing which is built up by the thrusting device produces a pressing pressure which acts on the pressing tools 9, 10 while these work their way into the fruit halves. The compression-spring arrangement thus preferably has a spring force which responds to a resistance in a fruit half which is caused by the flesh of the fruit.

According to an embodiment of the invention a built up spring force is about 300–550N for a spring course approximately 10 mm.

A pressure relief length of the compression springs 27, 28 is preferably selected such that, once the compression springs 27, 28 have been relieved of pressure, the pressing tools 9, 10 have pressed the flesh of the fruit half to the full extent. For this purpose, the length of the excursion of the compression springs 27, 28 preferably corresponds to the depth of a hollow receptacle minus the thickness of the skin of a fruit half.

For the purpose of adjusting a thrust path of the carriage 20, the thrusting device, in this case the crossmember 26, operates between a selectable advancement-side stop and a selectable return-side stop. The advancement-side stop is selected such that, once the compression springs 27, 28 have been relieved of pressure or with selectable residual prestressing, the pressing tools 9, 10 engage in the hollow receptacles in the pressing position, and thus in the fruit halves, to a predeterminable depth.

The compression springs 27, 28 have the effect of slowing down the ad vancement of the pressing tools 9, 10 when the latter come into contact with the fruit halves, since, in this case, the resistance produced by the fruit halves means that continued advancement results in the compression springs 27, 28 being compres sed until the advancement-side stop has been reached. Since the rotating pressing tools 9, 10 work their way into the fruit halves under the action of the spring force of the compression springs 27, 28, and thus there is continued advancement of the carriage 20, which follows a pressure-relief length of the compression springs 27, 28, a definitive penetration depth of the pressing tools 9, 10 is finally reached. Selection of the compression springs 27, 28 in terms of spring force and resilience thus influences the advancement path and advancement rate of the pressing tools 9, 10.

The advancement device operates via the rossmember 26. The crossmember 26, for its part, is moved back and forward by a connection rod 32, which acts on a lug 31 of the rossmember 26 and is arranged eccentrically on a toothed disk 33, which, for its part, is displaced by a drive motor 36 via a chain drive 34 and a chain pinion 35. This drive motor may be actuated continuously or intermittently.

At the same time, the toothed disk 33 drives the round plates 4, 5 by engaging in a toothed disk 37, which is connected firmly to the round plate 4 in the direction of rotation and, for its part, meshes with an identical toothed disk 38, which is connected firmly to the round plate 5, with the result that the two rotate synchronously in opposite directions and the round plates 4, 5 move correspondingly.

However, the toothed disk 33 has toothing over only approximately a third of its circumference, and it is not in toothed engagement over the rest of its rotational path. This means that, with each revolution of the toothed disk 33, the toothed disks 37, 38 execute only one third of a revolution. The revolutionary steps are determined precisely, and arrested if there is no drive engagement, via a triangular latching wheel 39, which is connected rigidly and coaxially to the toothed disk 38 and the round plate 5, and a latching lever 40, which is pressed against said latching wheel via a tension spring and is mounted coaxially on the toothed disk 37. When the toothed disk 33 causes the toothed disks 37 and 38, and the associated round plates, to rotate through 120°, the latching wheel 39 rotates correspondingly, and first of all presses the lever 40 outward by way of the adjacent corner of the triangle and then holds in the new position with abutment of one triangle side against the lever 40.

Furthermore, a drive 36 for the advancement device can be actuated via a time-control device 37. This makes it possible for the advancement device i.e. in this case the crossmember 26, to be kept at the advancement-side stop during a selectable period of time. This means that the compression springs 27, 28 are available for a selectable period of time, during which they can be relieved of pressure in correspondence with the advancement of the pressing tools 9, 10 in the fruit halves.

This time-control device permits adaptation to the quality of the flesh of the fruit, in particular the strength thereof. Thus, for example in the case of fruits with particularly firm flesh, the round plates 4, 5 can be kept in the pressing station (and thus, of course, in the other stations as well) for a long period of time, in order for the flesh of the fruit to be removed thoroughly. Conversely, in the case of soft fruits, immediate return of the pressing tools may be appropriate. For this purpose, the front side of the apparatus may be provided with an actuating knob which makes it possible to adjust the pressing time in a stepless or stepwise manner via an electrical potentiometer or some other suitable actuating element.

The compression-spring arrangement according to the invention additionally permits spring-cushioning of the pressing tools 9, 10 when they come into contact with the skin of a fruit half Should the pressing tools be displaced against the skin, the spring-cushioning reduces impingement thereon.

Although the invention has been described in connection with what is presently considered to be the most practical and preferred embodiments, it is to be understood that the invention is not limited to the disclosed embodiments, but rather, is intended to cover various modifications and equivalent arrangements included within the spirit and scope of the appended claims.

What is claimed is:

1. A citrus fruit press comprising:
   at least one pressing unit, each pressing unit including a feed device having two associated carriers, each said carrier having at least one fruit-half-receiving hollow receptacle, each said carrier mounted such that it can be moved symmetrically with respect to its associated carrier so that said receptacles move from a mutually facing receiving position, via a cutting position, into a pressing position;
   two pressing tools, each of which rotate about an associated spindle;
   a carriage upon which said pressing tools are mounted, which can advance and return the pressing tools, in the pressing position, into and from the hollow receptacles device, and
   a thrusting device acting on the carriage via a compressive device on the advancement side, said compressive device comprising a compression-spring arrangement having a spring force which responds to a resistance in a fruit half which is caused by the flesh of the fruit.

2. The citrus fruit press as in claim 1, wherein the length of an excursion of said compressive device is approximately equal to the depth of a hollow receptacle minus the thickness of the skin of a fruit half.

3. The citrus fruit press as in claim 2, wherein, for the purpose of adjusting a thrust path of the carriage, the thrusting device operates between a selectable advancement-side stop and a selectable return-side stop.

4. The citrus fruit press as in claim 3, wherein the advancement-side stop can be selected such that, with selectable residual prestressing of a compression-spring arrangement, the pressing tools engage in the hollow receptacles to a predeterminable depth.

5. The citrus fruit press as in claim 4, further comprising a time control device for actuating said advancement of said carriage.

6. The citrus fruit press as in claim 5, wherein the time-control device can be adjusted such that the thrusting device is retained on the advancement-side stop until said compressive device has been selectably relieved of pressure by the rotating pressing tools penetrating into the fruit halves.

7. The citrus fruit press as in claim 6, wherein the carriage is mounted displaceably on guide rods which run parallel to the central axes of the pressing tools.

8. The citrus fruit press as in claim 7, wherein the thrusting device comprises thrust blocks which are seated on the guide rods and act, in the advancement direction, on an advancement-side of the carriage via a compression spring which is seated on the guide rod and act, in the return direction, on a return side of the carriage.

9. The citrus fruit press as in claim 8, wherein the thrust blocks are formned by a crossmember which is seated on the ends of the guide rods.

10. The citrus fruit press as 9, wherein the hollow receptacles are arranged circumferentially in two hollow receptacle carriers, which rotate about fixed spindles, and said hollow receptacles rotate in a stepwise manner between a receiving position, a pressing position, and an ejecting position, these positions each being offset by an angle of rotation of approximately 120° with respect to one another, it being the case that, in the pressing position, the hollow receptacle carriers have hollow receptacles aligned parallel to one another.

11. The citrus fruit press as in claim 10, wherein each hollow receptacle carrier has three hollow receptacles, which are offset by approximately 120° with respect to one another.

12. The citrus fruit press as in claim 11, wherein the advancement and return movement of the carriage is coupled to the rotational movement of the hollow receptacle carriers.

13. The citrus fruit press as in claim 12, wherein the drive for the rotating pressing tools is arranged on the carriage.

14. The citrus fruit press as in claim 13, wherein the hollow receptacle carriers have a controllable drive which can be coupled to a control drive of the thrusting device.

* * * * *

UNITED STATES PATENT AND TRADEMARK OFFICE
CERTIFICATE OF CORRECTION

PATENT NO. : 5,906,153
DATED : May 25, 1999
INVENTOR(S) : Brinkmann

It is certified that error appears in the above-indentified patent and that said Letters Patent is hereby corrected as shown below:

Column 2, line 15, insert "." after the word --thereof--;

Column 4, line 6, insert "." after the word --half--;

line 36, replace "ad vancement" with --advancement--;

line 40, replace "compres sed" with --compressed--;

line 51, replace "rossmember" with --crossmember--;

line 54, replace "rossmember" with --crossmember--;

Column 5, line 41, insert "." after the word --half--;

and in the Claims are as follows:

Claim 1, Column 5, lines 65 & 66, replace "receptacles device, and" with --receptacles; and--;

Claim 9, Column 6, line 40, replace "formned" with --formed--;

UNITED STATES PATENT AND TRADEMARK OFFICE
CERTIFICATE OF CORRECTION

PATENT NO. : 5,906,153
DATED : May 25, 1999
INVENTOR(S) : Brinkmann

It is certified that error appears in the above-indentified patent and that said Letters Patent is hereby corrected as shown below:

Claim 10, Column 6, line 42,   insert "in claim" after the word --as--.

Signed and Sealed this

Thirtieth Day of November, 1999

Attest:

Attesting Officer

Q. TODD DICKINSON

Acting Commissioner of Patents and Trademarks